Patented May 21, 1940

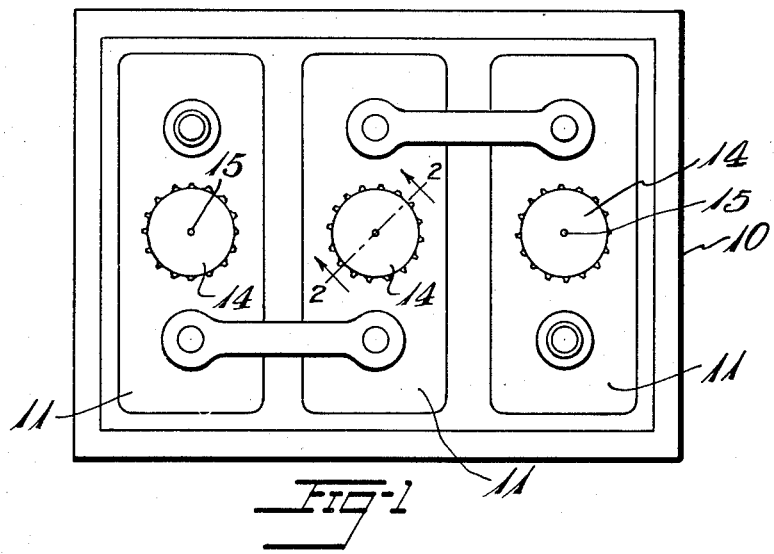
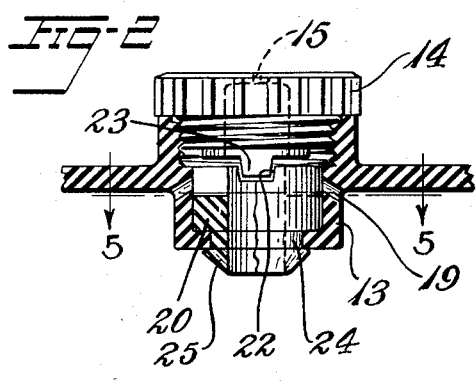
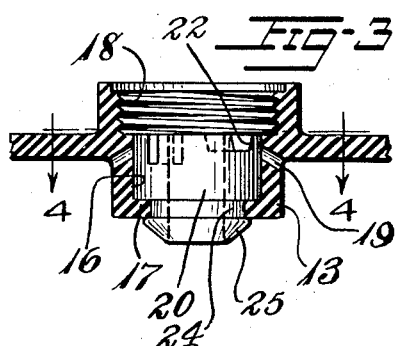
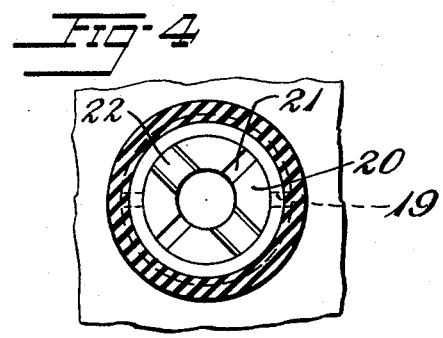
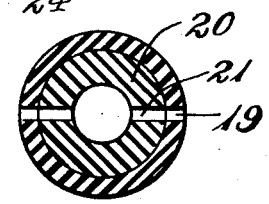

2,201,275

UNITED STATES PATENT OFFICE 2,201,275

COVER ASSEMBLY FOR STORAGE BATTERIES

Frank Slusher, Akron, Ohio, assignor to The B. F. Goodrich Company, New York, N. Y., a corporation of New York Application April 27, 1938, Serial No. 204,614

2 Claims. (Cl. 136—178)

This invention relates to cover assemblies for storage batteries, and is especially useful where it is desired to control venting of the cell above the normal fluid level.

In the use of storage batteries it is necessary to inspect and to refill the battery often so as to keep the fluid above the plates. Over filling of the battery results in violent gas ebullition which sprays acid from the battery. Such spray is to be avoided as much as possible because of its corrosive effect upon surrounding objects.

The principal objects of this invention are to provide against over filling of the battery, to provide for venting of gas from above the liquid level when the battery is in use and to provide simplicity of structure.

These and other objects will appear from the following description and the accompanying drawing.

Of the drawing:

Fig. 1 is a plan view of a storage battery of multiple cell type.

Fig. 2 is a vertical sectional view thereof taken on line 2—2 of Fig. 1 with the vent plug in place.

Fig. 3 is a similar view of the same with the vent plug removed.

Fig. 4 is a cross sectional view taken on line 4—4 of Fig. 3.

Fig. 5 is a cross sectional view taken on line 5—5 of Fig. 2.

Referring to the drawing, the numeral 10 designates a battery container divided by partitions to provide a plurality of battery cells each sealed by a cell cover 11 of hard rubber or other rigid plastic material. The battery cell covers are sealed in place by bituminous material 12. Each cell cover is formed with a vent and filler well 13 extending therebelow to contact with an electrolyte in the cell defining a filler opening and closed by a vent plug 14 having a vent opening 15 therethrough.

Each vent well has a smooth bored portion 16 in its lower part terminating in an inwardly turned flange 17, and has a threaded portion 18 thereabove to which the vent plug 14 is removably secured by a cooperating threaded portion. One or more vent openings 19 extend through the wall of the vent well to permit gas to escape from the space above the electrolyte. To provide for automatically closing the vents 19, where the vent plug is removed, an annular valve member 20 is rotatably mounted in the vent well and extends above the vents 19. A cross slot 21 in the valve member may be aligned with the vents, by rotation of the valve member, and the valve member is also formed with a driving slot 22 adapted to engage a driving lug 23 on the vent plug and to cause simultaneous rotation of the vent plug and the valve member. The arrangement is such that as the vent plug is unscrewed, the valve member is turned to a position where it shuts off the vents just as the vent plug reaches the end of the threads and is lifted out, and upon screwing the plug into place, the plug is engaged again with the valve member and turned until it reaches the end of its closing movement, at which position, the groove 21 will be aligned with the vents 19 so as to permit gas to travel to the vent 15 in the vent plug.

To retain the valve member in proper relation to the vent well, the valve member, which is of hard rubber, is formed with a tubular reduced neck portion 24 adapted to rotate within the flange 17, and a head or flange 25 extending therebeyond, both of soft vulcanized rubber and integral with the valve member. The head 25 is preferably cone shaped and may be distorted sufficiently to be passed through the aperture within the flange 17. When once in place the button head retains the valve in place against considerable force, while at the same time it permits the valve member to be turned in its seat.

When sulfuric acid is used as an electrolyte the surfaces of the hard rubber parts are usually wet and this assists in sealing the valve members so as to prevent the escape of gas.

Due to the novel construction of the apparatus, accidental displacement of the valve member is resisted by the integral resilient flange or button engaging the vent and filler well, and positive operation of the valve so as automatically to close the side aperture in the vent well when the plug is removed and to open it when the plug is replaced is assured, while jamming of the parts due to changes in temperature is prevented by the resilience of the retaining means.

Many modifications of the invention may be made without departing from the invention as defined by the following claims.

I claim:

1. A battery cover assembly having a vent and filler well adapted to engage a filler plug and having a depending cylindrical skirt extending below the cover and terminating in an inwardly turned flange defining a reduced opening, said skirt having a side opening for venting the battery, a ring-shaped valve member mounted within the skirt above said flange and adapted to be rotated to expose or cover said side opening, a vented filler plug adapted to engage the vent well by a rotative locking movement and having means for engaging and rotating said valve during such locking movement, and a resilient button integral with said valve member and having a hollow neck rotatable within said reduced opening of the vent well skirt and a head insertable through said reduced opening and adapted to engage under said flange to retain the valve member in place against an accidental displacing force.

2. A cell cover assembly comprising a cell cover provided with a vent and filler well extending below the cover to contact with an electrolyte and having a side aperture below the cover communicating with the space above the electrolyte and an apertured bottom presenting a downwardly facing surface, a ring-shaped valve member rotatable in said vent well to control flow of gas through said side aperture, said well having a seat therein for said valve member, a vented closure plug adapted to close the top of the vent and filler well by compound rotary and linear movement, said plug and said valve having interengaging means for rotating the valve by means of the plug and permitting movement of the plug toward and away from the valve, and means integral with said valve for retaining said valve in said well against accidental displacement, said means comprising a portion extending through the apertured bottom of the well and a resilient flange engaging below said downwardly facing annular surface of said well upon insertion of the flange through the aperture.

FRANK SLUSHER.